3,485,734
PROCESS OF TREATING POLYIMIDE FILM
IN AN ELECTRIC DISCHARGE
James T. Pecka, Tonawanda, N.Y., assignor to E. I. du
Pont de Nemours and Company, Wilmington, Del., a
corporation of Delaware
No Drawing. Filed May 17, 1967, Ser. No. 639,034
Int. Cl. C07c 3/24; B01k 1/00
U.S. Cl. 204—165                                    5 Claims

ABSTRACT OF THE DISCLOSURE

Polyimide film containing fluoropolymer is treated by electrical discharge with an energy density of at least 300 watt-minutes per square foot to impart adherability of a level to produce non-peelable bonds.

RELATED APPLICATIONS

Resinous material of polyimide containing fluoropolymer for bearing applications is disclosed in the pending application of Gerow, Ser. No. 597,564, filed Nov. 29, 1966, now U.S. Patent 3,356,759. Such material further containing a polyamide is disclosed in the pending application of Matray, Ser. No. 623,773 filed Mar. 16, 1967, now U.S. Patent 3,356,760. Electrical discharge treatment of a variety of polymers is the subject matter of numerous applications and patents. For example the U.S. Patent to Wolinski, No. 3,274,089 discloses such a treatment of polyimide and of polytetrafluoroethylene, in an organic vapor, to improve adhesion characteristics.

BACKGROUND OF THE INVENTION

Polyimide containing fluoropolymer and optionally a polyamide is of particular interest in bearing applications. In some bearing practices it is necessary that the bearing material be attached to a substrate and it is desirable that this be accomplished through the use of high strength adhesives. Further, in view of the operating conditions to which bearings may be subjected and the severe conditions employed in fabrication, it is apparent that very good bonds must be developed. This has not been accomplished heretofore.

SUMMARY OF THE INVENTION

In the present invention polyimide containing fluoropolymer, and polyamide if desired, is made adherable to a variety of substrates by a process that, broadly described, comprises subjecting such polyimide to an intense electrical discharge treatment. More specifically this desirable result is achieved by subjecting such a material to an electrical discharge in an atmosphere of air at a temperature exceeding about 70° C. and under conditions of voltage and current to impart at least about 300 watt-minutes per square foot of bearing material treated. The resulting product can thereafter be attached to a substrate, by use of a suitable adhesive, and the bond developed will be non-peelable.

In a typical practice of the invention, a continuous web of preformed film, e.g., a continuous self-supporting film of polyimide containing a fluoropolymer, is passed continuously between a set of spaced electrodes. These can comprise a rotating metal roll connected electrically to ground, and one or more stationary metal rod or bar electrodes connected to a power source and disposed parallel to the longitudinal axis of the roll and spaced a distance of from 0.015 to 0.1 inch or more from its surface. The roll can be a steel drum covered with a dielectrical material such as polyethylene terephthalate or polypropylene. The "hot" electrode can be a metal such as brass or be covered with ceramic or the like and constitutes the positive electrode, which can, if desired, be adapted to receive cooling fluid. Electrical discharge in the present invention is carried out in ambient air. The air may, if desired, be introduced into the discharge zone through one or more conduits thereto. The humidity of the air is not critical and can, for example, range from 10 to 90 percent R.H. To achieve the operating temperature, the air constituting the atmosphere can be heated, or a heated back-up roll or drum can be used. Apparatus of the type indicated is known to the art.

In carrying out the surface treatment of this invention, the power can be supplied by an audio-frequency generator powered by a power amplifier with a push-pull oscillator operating at a frequency, for example, of 10,000 to 20,000 cycles per second. The potential difference between the electrodes of between 3,000 and 6,000 R.M.S. (root mean square) volts with currents of between 0.1 and 0.5 R.M.S. amperes, deliver power levels varying from about 150 to 3,000 watts to the electrodes. The spacing between the electrodes through which the film passes can vary from about 0.015 inch to 0.1 inch or more. The film can be passed between the electrodes at varying speeds and different numbers of passes, it being essential only to obtain at least the minimum energy density of 300 watt-minutes per square foot. Densities beyond 1000 watt-minutes per square foot can be applied but no advantage is seen in very high densities. Electrodes of any width can be used and in actual practice of the present discovery electrodes of 8 inches to 2.5 feet in width have been employed.

In addition to the influence of the atmosphere and energy density of the discharge applied, it has been found that the film history can influence the effectiveness of the electrical discharge treatment. It has been found preferable to treat that side of the film which was not in contact with the casting drum during the film casting operation. Where it is desired to treat the side that was in contact with the drum, its susceptibility to improvement upon electrical discharge treatment can be increased by facing that side toward the heaters in the film drying operation in those cases where the film is dried with heaters on only one side. Although this relative behavior of the two sides is not completely understood, it is thought to be associated with the smoothness of the film surface. The smoother side of the film always exhibits the greatest improvement in subsequent adhesion tests upon treating with 300 watt-minutes per square foot or more.

The compositions that are treated in accordance with the present invention are those disclosed in the copending applications of Gerow and of Matray identified above. Those applications are hereby incorporated herein in their entirety by reference. In general the compositions are composed of 50 to 90 parts by weight of polyimide, 10 to 50 parts by weight of a fluorocarbon resin and 0 to 15 parts by weight of polyamide. Where the polyamide is used, the composition preferably is composed of 55 to 80 parts of the polyamide, 20 to 40 parts of the fluorocarbon resin and 1 to 15 parts of polyamide.

Specifically, the polyimides are of organic diamines and tetracarboxylic acid dianhydrides, the organic diamines having the formula $H_2N-R'-NH_2$ where $R'$ is a divalent aromatic radical (arylene), preferably one of the following groups: phenylene, naphthylene biphenylene, anthrylene, furylene, benzfurylene, and (1) 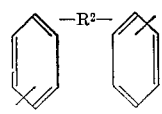

where $R^2$ is alkylene of 1–3 carbon atoms, oxygen, sulfur, or one of the following:

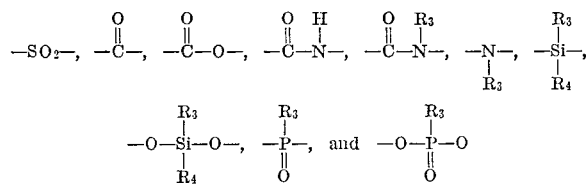

wherein $R^3$ and $R^4$ are alkyl or aryl, and substituted groups thereof.

Among the diamines suitable for use in the present invention are: meta-phenylenediamine; paraphenylenediamine; 2,2-bis(4-aminophenyl)propane; 4,4′ - diaminodiphenylmethane; 4,4′ - diaminodiphenyl sulfide; 4,4′ - diaminodiphenyl sulfone; 3,3′ - diaminodiphenyl sulfone; 4,4′-diaminodiphenyl ether; 2,6 - diaminopyridine; bis(3-aminophenyl)diethylsilane; benzidine; 3,3′ - dichlorobenzidine; 3,3′ - dimethoxybenzidine; bis(4 - aminophenyl) ethyl-phosphine oxide; 4,4′ - diaminobenzophenone; bis(4-aminophenyl)phenylphosphine oxide; N,N-bis(4 - aminophenyl)butylamine; N,N - bis(4 - aminophenyl)methylamine; 1,5 - naphthalenediamine; 3,3′ - dimethyl - 4,4′-diaminobiphenyl; 3,4′ - diaminobenzanilide; 4 - aminophenyl 3-aminobenzoate; 2,4-bis(beta - amino - t - butyl)-toluene; bis(p-beta-amino-t-butylphenyl) ether; p-bis-2-(2-methyl-4-aminopentyl)benzene; p - bis(1,1 - dimethyl - 5-aminopentyl)benzene; m-xylylenediamine; p - xylylenediamine; N,N - bis(4 - aminophenyl)phenylamine; and mixtures thereof.

The tetracarboxylic acid dianhydrides are characterized by the following formula:

(2)

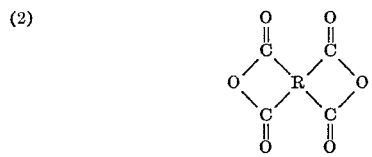

where R is a tetravalent organic radical, e.g., aromatic, aliphatic, cycloaliphatic, heterocyclic, combination of aromatic and aliphatic, or substituted groups thereof. Illustrative are the following:

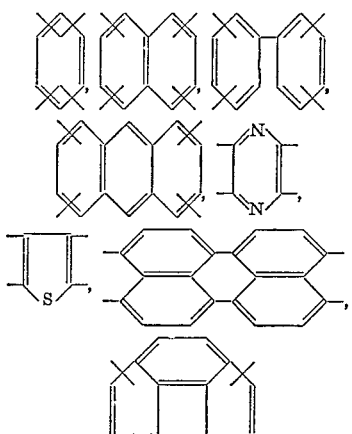

and

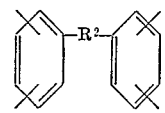

wherein $R^2$ has the same meaning as above.

In these dianhydrides every carbonyl group above is attached directly to a separate carbon atom of the aromatic radical, the carbonyl groups being in pairs, the groups of each pair being adjacent to each other. Adjacent means ortho or peri, so that the dicarboxylanhydro rings are 5- or 6-membered, respectively.

Illustrations of dianhydrides suitable for use in the present invention include:

pyromellitic dianhydride;
2,3,6,7-naphthalenetetracarboxylic dianhydride,
3,3′,4,4′-diphenyltetracarboxylic dianhydride;
1,2,5,6-naphthalenetetracarboxylic dianhydride;
2,2′,3,3′-diphenyltetracarboxylic dianhydride;
2,2-bis(3,4-dicarboxyphenyl)propane dianhydride;
bis(3,4-dicarboxyphenyl) sulfone dianhydride;
3,4,9,10-perylenetetracarboxylic dianhydride;
bis(3,4-dicarboxyphenyl)ether dianhydride;
ethane-1,1,2,2-tetracarboxylic dianhydride;
naphthalene-1,2,4,5-tetracarboxylic dianhydride;
naphthalene-1,4,5,8-tetracarboxylic dianhydride;
decahydronaphthalene-1,4,5,8-tetracarboxylic
  dianhydride;
2,6-dichloronaphthalene-1,4,5,8-tetracarboxylic
  dianhydride;
2,7-dichloronaphthalene-1,4,5,8-tetracarboxylic
  dianhydride;
2,3,6,7-tetrachloronaphthalene-1,4,5,8-tetracarboxylic
  dianhydride;
phenanthrene-1,8,9,10-tetracarboxylic dianhydride;
cyclopentane-1,2,3,4-tetracarboxylic dianhydride;
pyrazine-2,3,5,6-tetracarboxylic dianhydride;
2,2-bis(2,3-dicarboxyphenyl)propane dianhydride;
1,1-bis(2,3-dicarboxyphenyl)ethane dianhydride;
1,1-bis(3,4-dicarboxyphenyl)ethane dianhydride;
bis(2,3-dicarboxyphenyl)methane dianhydride;
bis(3,4-dicarboxyphenyl)methane dianhydride;
bis(3,4-dicarboxyphenyl)sulfone dianhydride;
benzene-1,2,3,4-tetracarboxylic dianhydride;
1,2,3,4-butanetetracarboxylic dianhydride;
thiophene-2,3,4,5-tetracarboxylic dianhydride;
3,4,3′,4′-benzophenonetetracarboxylic dianhydride;
2,3,2′,3′-benzophenoetetracarboxylic dianhydride;
2,3,3′,4′-benzophenonetetracarboxylic dianhydride; etc.

The second essential component according to this invention is a halocarbon resin having the recurring unit:

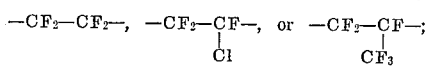

or copolymers containing two or more of the foregoing. Representative of such halocarbon resins are the homopolymers of tetrafluoroethylene and chlorotrifluoroethylene, and also copolymers of tetrafluoroethylene with hexafluoropropylene.

The preferred halocarbon resin is a modified polymer of the type known as a telomer. The telomers are wax-like materials which are the reaction products of a halocarbon having the unit shown above, such as tetrafluoroethylene, and an active telogen. Such telomers are known in the art and are described, for example, in Brady U.S. Patent No. 3,067,262 issued Dec. 4, 1962, the entire disclosure of which is incorporated herein by reference. Active telogens are of course also well known in the art. Representative active telogens are tertiary hydrocarbons such as isobutane, isopentane, methylcyclopropane, 2,3-dimethylbutane, methylcyclohexane, etc.; aliphatic ethers with alpha hydrogen atoms such as tetrahydrofuran, diethyl ether, dioxane, 1,2-dimethoxyethane, diethylene glycol dimethyl ether, etc.; tertiary aliphatic amines such as trimethylamine, triethylamine, triethylenediamine, etc.; aliphatic alcohols containing an alpha hydrogen such as methanol, ethanol, isopropanol, sec-butyl alcohol, cyclohexanol, etc.; bivalent aliphatic sulfur compounds such as ethyl mercapton, dimethyldisulfide, diethyldisulfide, dipropyldisulfide, etc.; aliphatic carbonyl compounds such as aldehydes, ketones, diketones, acids, esters, etc. containing an alpha hydrogen atom such as acetaldehyde, acetone, methyl ethyl ketone, 2,4-pentanedione, ethyl acetoacetate, isobutyric acid, gamma-valerolactone, etc.; dialkyl phosphites such as dimethyl phosphite, diethyl phosphite, etc.; dialkylamides such as N,N-dimethylformamide, etc.; chloro-form, carbon tetrachloride, trichlorotrifluoroethane, and the like.

The polyamides, an optional component according to this invention, is of one of the following two classes:

*Class 1.*—Linear condensation polyamides of an aliphatic dibasic acid of 4–18 carbon atoms, such as succinic, glutaric, adipic, pimelic, suberic, azelaic, sebacic, 1,12-diodecanedioic, hexadecamethylene dicarboxylic, and the like, and an alkylene diamine of 2–10 carbon atoms, such as ethylene diamine, trimethylene diamine, propylene diamine, tetramethylene diamine, pentamethylene diamine, hexamethylene diamine, 1,8-diaminooctane, 1,9-diaminononane, 1,10-diaminodecane, and the like. These linear condensation polyamides are described, for example, in Carothers U.S. Patent No. 2,071,250 issued Feb. 16, 1937, the entire disclosure of which is hereby incorporated by reference.

*Class 2.*—Aromatic polyamides characterized predominantly by the recurring structural unit

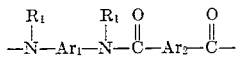

wherein $R_1$ is hydrogen or alkyl of 1–4 carbons, and herein $Ar_1$ and $Ar_2$ can be the same or different and can be an unsubstituted divalent aromatic radical or a substituted divalent aromatic radical, the chain-extending bonds of these divalent aromatic radicals being oriented meta or para to one another and the substituents attached to any aromatic nucleus being one or more or a mixture of lower alkyl, lower alkoxy, halogen, nitro, lower carbalkoxy, or other groups which do not form a polyamide during polymerization, the term "lower" referring to less than five carbon atoms.

These aromatic polyamides of Class 2 are also known in the art and they and their preparation are described, for example, in Hill, Kwolek and Sweeny U.S. Patent No. 3,094,511, the entire disclosure of which is hereby incorporated by reference.

As stated therein, the aromatic polyamides are reaction products of an aromatic diacid chloride with an aromatic diamine. Diacid chlorides which may be utilized to prepare the polyamides include isophthaloyl chloride, lower alkyl isophthaloyl chlorides, lower alkoxy isophthaloyl chlorides, halogen-substituted isophthaloyl chlorides, nitro and lower carbalkoxy isophthaloyl chlorides, phenyl substituted isophthaloyl chlorides, and any combination of the foregoing.

In addition to isophthaloyl chlorides and substituted isophthaloyl chlorides specified above, the corresponding unsubstituted and substituted terephthaloyl chloride may also be used. In addition to the single ring diacid chlorides specified above, multiple ring diacid chlorides in which the acid chloride groups are oriented meta or para with respect to each other are also useful in this invention. Exemplary of such compounds are 4,4'-oxydibenzoyl chloride, 4,4'-sulfonyldibenzoyl chloride, 4,4'-dibenzoyl chloride, 3,3'-oxydibenzoyl chloride, 3,3'sulfonyldibenzoyl chloride, and 3,3'-dibenzoyl chloride, the corresponding bromides and fluorides, and similar compounds in which one or both of the aromatic rings contains one or more or a combination of lower alkyl, lower alkoxy, halogen, nitro, sulfonyl, lower carbalkoxy groups.

Exemplary diamines useful as reactants in forming the polyamide include meta-phenylene diamine and lower alkyl substituted meta-phenylene diamine such as methyl-, ethyl-, propyl-, etc., meta-phenylene diamine; N,N-dimethylmetaphenylene diamine, N,N'-diethylmetaphenylene diamine, etc. In place of an alkyl group, the aromatic ring may be substituted with one or more lower alkoxy groups such as, for example, methoxy-, ethoxy-, propoxy-, butoxy-, etc., meta-phenylene diamine. Halogen-substituted meta-phenylene diamine as exemplified by chloro, bromo, and fluoro meta-phenylene diamine may be utilized. Other meta-phenylene diamines which may be used include nitro and lower carbalkoxy meta-phenylene diamines.

In addition to meta-phenylene diamine and substituted meta-phenylene diamines specified above, the corresponding unsubstituted and substituted para-phenylene diamine compounds may also be used. In addition to the single ring aromatic diamines specified above, multiple or fused ring aromatic diamines in which the amino groups are oriented meta or para with respect to each other are also useful in this invention. Exemplary of such compounds are 4,4'-oxydiphenyldiamine, 4,4'-sulfonyldiphenyldiamine, 4,4'-diphenyldiamine, 3,3'-oxydiphenyldiamine, 3,3'-sulfonyldiphenyldiamine, and 3,3'-diphenyldiamine, and the corresponding compounds in which one or both of the aromatic rings contains one or more or a combination of lower alkyl, lower alkoxy, halogen, nitro, sulfonyl, lower carbalkoxy groups. The total number of carbon atoms in the substituent groups attached to an aromatic ring in the single ring or multiple ring reactants should not exceed nine.

For further details as to the polyamides, their scope, the reactants used to prepare them and the like, reference should be made to the Matray application cited above.

As taught in both Gerow and Matray, the compositions are formed by incorporating the halocarbon, and polyamide if employed, in the polyamide-acid precursor of the polyimide. Thereafter the composition is shaped into a useful structure, such as a film, and the polyamide-acid therein is then converted to polyimide. Various methods of accomplishing the foregoing are disclosed in the cited applications to which reference should be made for details. The preferred manner of shaping is the casting of a film of the polyamide-acid mixture on a drug or like shape, but other systems can as well be employed. In general, films of 1 to 35 mils are prepared for normal bearing applications.

The shapes treated in this invention have the halocarbon resin, and the polyamide if employed, uniformly dispersed through the polyimide material. The dispersed particles can be of any convenient size and shape, but generally no advantage is seen to exceed solid particles sizes of 800–1000 microns average diameter. The halocarbon resin can be used in the form of a floc of 1/64 inch fibers or perhaps more usually in the form of a dispersion in which the particle size is about 10–500 microns average diameter. The preferred telomers will ordinarily be used in the form of particles generally below about 5 microns average. There is no critical lower limit on particle size and they of course can be used as small as they can be made. In addition to the foregoing components, the compositions can optionally contain conventional bearing material additives for their intended purpose such as particles of graphite, bronze, molybdenum sulfide, etc.

After surface treatment as in the present invention, the film or other shape of halocarbon-containing polyimide can be attached to a substrate for subsequent use. For this purpose adhesives of various types can be employed, and suitable adhesive compositions are well-known to the art. One suitable type is the phenol-modified rubber type. Another is the amino-modified acrylic polymers combined with epoxide compounds as described by Usala and Wolinski in U.S. Patent 3,228,823. The adhesive can be applied by any convenient method such as doctor blade, spray or roller coating. A 0.25 mil (dry) total thickness is sufficient and up to 1 mil has been used. The film, the substrate, or both can be coated with adhesive, which can thereafter be dried for a short period. The bearing assembly is then pressed and heated to activate the adhesive, and is held at those conditions for a suitable time determined essentially by the adhesive used, as known to the art.

The substrates to which the improved films and other shapes of this invention can be adhered include steel, aluminum and other metals as well as phenolic resins and other plastic and polymeric materials. The substrate shape can include sheets, blocks, cylinders, etc. The treated film can be adhered to itself for such purposes as making continuous belts and bands. It also can be adhered to wood for such purposes as drawer slides. Where metals are used, a surface treatment such as sanding, or a phosphate treatment for steel, or a chromate treatment for aluminum, can be practiced.

The invention will be described further, in conjunction with the following examples, which are not to be construed as limiting the invention.

Examples 1 to 26

Films of bearing material were prepared as follows: Metered streams of polyamide-acid solution [15% by weight solution of the polyamide-acid of pyrometallitic dianhydride and 4,4'-diaminodiphenyl ether in N,N-dimethylacetamide (DMAC)], acetic anhydride, and beta-picoline were mixed in a mole ratio of 1:5:.5 1.6 in a refrigerant-jacketed pipeline mixer. An additional stream formed by mixing 12% by weight dispersion in DMAC of halocarbon telomer (poly-tetrafluoroethylene telomor, prepared according the procedure of Example 1 by Brady U.S. Patent 3,067,262, employing trichlorotrifluoroethane as the telegon (and a 20% by weight solution in DMAC of polyamide (poly methaphenylene isothalamide, containing 3.5% by weight calcium chloride and 1% by weight ammonium chloride), was joined into the pipeline mixer, such that the ratio of the polyamide-acid solution, halocarbon telomer dispersion, and polyamide solution was kept at 13.6:6.4:1 by weight, corresponding to a ratio of polyimide:telomor:polyamide in the finished film of 63:32:5 by weight. The temperature of the mixture was held at −10° C. during mixing and transport to a die from which the mixture was extruded directly onto a casting drum heated at 135 to 140° C. The gel film was stripped from the drum and dried under restrain in an oven at 430° C. to produce films of bearing material 5 mils thick.

The films so prepared were then subjected to electrical discharge treatment in an atmosphere of air under varying conditions of side treated, total energy density, energy per pass, film speed and the like. Electrical discharge apparatus of conventional type was employed to treat the films. The electrode spacing was about 0.040 inch, the electrode width was 2.5 feet, and heat was supplied through the backup roll with which the film was in contact during treatment.

The films obtained were laminated to 4 x 4 x 0.025-inch pieces of cold rolled steel. This was accomplished by coating both the lightly sanded steel and the film with a phenol modified nitrile rubber adhesive (Plastilock 605). The adhesive was formulated from 60 grams of Plastilock (30% solids), 15 grams methyl ethyl ketone and 15 grams of toluene. The adhesive coated film and metal were air dried a few minutes, and then further dried in a vented oven at 80° C. for 20 minutes. The film and metal were placed with their adhesive coatings face-to-face, and sandwiched between layers of rubber and steel. These sandwiches were then pressed for 20 minutes at 180° C. and 300 p.s.i. The laminates were removed from the press and, after cooling, were tested for peel strength.

A second group of specimens was bonded using an adhesive mixture of 64.5 gms. of a 35 weight percent solution of amino modified acrylic polymer in a solvent of toluene, xylene and isopropyl alcohol, and 7.1 gms. of a 45 weight percent solution of the diglycidyl ether of resorcinol in toluene (Kopoxite 159). Adhesive was applied only to the metal, which was then dried in air for a few minutes followed by oven drying at 125° C. for one minute. Sandwiches made as before were pressed 4 minutes at 200° C. and 200 p.s.i. The resulting laminates were cooled to room temperature in the press and thereafter tested for peel strength.

The data obtained are summarized in the following table. Of the items in Table I, Examples 1 to 16 and 23 to 26 used the nitrile rubber adhesive while the acrylic-epoxy adhesive was used with Examples 17 to 22. The treating temperature for Examples 5 and 6 was 23° C. while for all others it was 100° C. The generator supplying power was used at a frequency of 20 kilocycles for Examples 7, 8, 15 and 16 and 22, and at 10 kilocycles for the remainder.

The peel strength data of laminates is measured as follows: Parallel cuts, ½ inch apart, are made through the film and adhesive. A tab of film is pried up between the cuts and peeled on a Suter tester pulling the film at a rate of 12 inches per minute at a 90° angle to the substrate. The ½ inch peel value is multiplied by two to convert to grams per inch. In the case of bonds that cannot be peeled in the ½ inch wide strip, parallel cuts 1/16 to 1/8 inch wide are made through the film and adhesive. An attempt is made to pry up and peel the film between cuts. If the film cannot be peeled, the bond is described as non-peelable (NP). If a small section of the film can be lifted but tears before the peel can be propagated, the bond is called film tearing. If it can be peeled, the peel value is multiplied by the appropriate number to convert the value to grams per inch of width.

TABLE I

| Example | Speed (ft./min.) | Power (watts) | Number of passes | Energy per pass [1] | Total Energy | Side [2] treated | Peel [3] Strength (g./in.) |
|---|---|---|---|---|---|---|---|
| 1 | 5 | 2,700 | 1 | 215 | 215 | AH | 650 |
| 2 | 5 | 2,700 | 1 | 215 | 215 | DU | 1,600 |
| 3 | 5 | 2,700 | 2 | 215 | 430 | AH | NP |
| 4 | 5 | 2,700 | 2 | 215 | 430 | DU | 1,350 |
| 5 | 5 | 2,500 | 2 | 200 | 400 | AH | 600 |
| 6 | 5 | 2,500 | 2 | 200 | 400 | DU | 1,750 |
| 7 | 5 | 2,200 | 2 | 175 | 350 | AH | NP |
| 8 | 5 | 2,200 | 2 | 175 | 350 | DU | 1,550 |
| 9 | 3 | 2,700 | 1 | 360 | 360 | AH | NP |
| 10 | 3 | 2,700 | 1 | 360 | 360 | DU | 1,500 |
| 11 | 3 | 2,700 | 2 | 360 | 720 | AH | NP |
| 12 | 3 | 2,700 | 2 | 360 | 720 | DU | 1,550 |
| 13 | 3 | 2,700 | 3 | 360 | 1,080 | AH | NP |
| 14 | 3 | 2,700 | 3 | 360 | 1,080 | DU | 1,500 |
| 15 | 3 | 2,200 | 2 | 295 | 590 | AH | NP |
| 16 | 3 | 2,200 | 2 | 295 | 590 | DU | 2,000 |
| 17 | 5 | 2,700 | 1 | 215 | 215 | AH | 1,300 |
| 18 | 5 | 2,700 | 2 | 215 | 430 | AH | NP |
| 19 | 3 | 2,700 | 1 | 360 | 360 | AH | NP |
| 20 | 3 | 2,700 | 1 | 360 | 360 | DU | 1,605 |
| 21 | 3 | 2,700 | 2 | 360 | 720 | AH | NP |
| 22 | 5 | 2,200 | 2 | 175 | 350 | AH | NP |
| 23 | 3 | 2,700 | 1 | 360 | 360 | AH | NP |
| 24 | 3 | 2,700 | 1 | 360 | 360 | DU | 820 |
| 25 | 3 | 2,700 | 1 | 360 | 360 | AU | NP |
| 26 | 3 | 2,700 | 1 | 360 | 360 | DH | NP |

[1] Energy density per pass = $\frac{\text{Power (watts)}}{\text{Speed (ft./min.) x Electrode width (ft.)}}$

[2] A indicates air side while on the casting drum; D indicates drum side while on the casting drum; H indicates side facing heaters in dryer; U indicates side away from heaters in dryers.

[3] NP indicates non-peelable bond.

Additional data obtained on Examples 23 to 26 are summarized in Table II.

and 33. Peel strength was determined. The collected data are:

TABLE III*

| Example | Speed | Power | Number of Passes | Energy per Pass | Total Energy | Side Treated | Peel Strength |
|---|---|---|---|---|---|---|---|
| 27 | 3 | 3,000 | 1 | 400 | 400 | AH | NP |
| 28 | 3 | 3,000 | 1 | 440 | 400 | AH | NP |
| 29 | 3 | 3,000 | 1 | 400 | 400 | AH | NP |
| 30 | 3 | 3,000 | 1 | 400 | 400 | AH | NP |
| 31 | 3 | 3,000 | 1 | 400 | 400 | AH | NP |
| 32 | 3 | 3,000 | 1 | 400 | 400 | AH | NP |
| 33 | 3 | 3,000 | 1 | 400 | 400 | AH | NP |

*Same units and abbreviations as used in Table I.

TABLE II

| Example | Side Treated | Amount of Edge Peel [a] | Dimple Test [b] |
|---|---|---|---|
| 23 | AH | None | 4 to 1. |
| 24 | DU | >1 in. | (c). |
| 25 | AU | None | 4 to 1. |
| 26 | DH | ½ in. | 0. |

[a] This is the amount of peel at the edge of a laminate, when the excess, overhanging film is pulled back from the edge.
[b] After a bearing material-steel laminate is prepared, a dimple is made by pressing a ⅜″ steel ball against the metal side of the laminate; two parallel cuts are then made with a sharp knife through the bearing material layer across the top of the dimple about $\frac{1}{16}$ inch apart, and an attempt is made to peel the bearing material layer from the metal between these two cuts; the performance is rated on the following scale:
5—Does not peel at all.
4—Slight peel.
3—Peels almost halfway from top of dimple to the flat.
2—Peels past halfway from top of dimple to the flat.
1—Peels almost to the flat.
0—Peels all the way to the flat.
[c] Not tested since edge peel was greater than 1 inch.

EXAMPLES 27 TO 33

The films of bearing material used in these examples were prepared a follows: Metered streams of polyamide-acid solution (15% by wt. solution of the polyamide-acid of pyromellitic dianhydride and 4,4′-diaminodiphenyl ether in DMAC), acetic anhydride, and beta-picoline were mixed in a mole ratio of 1:6.6:1.6 in a refrigerant-jacketed pipeline mixer. An additional stream of 12% by wt. halocarbon telomer dispersion in DMAC, described in Examples 1 to 26, was joined into the pipeline mixer such that the weight ratio of the polyamide-acid solution to halocarbon telomer dispersion was 8:5, corresponding to a polyamide-acid to halocarbon telomer weight ratio of 2:1, and a polyimide to halocarbon telomer weight ratio in the finished film of about 65:35. Because of small variations in the composition and rates of the process streams, the final weight ratio ranged from about 63:37 to about 68:32. The temperature of the mixture was held at about −10° C. during mixing and transport to a die from which the mixture was extruded directly onto a casting drum heated at 135–140° C. The gel film was stripped from the drum and dried under restraint in an oven at 430° C. to produce films of bearing material 5 mils thick. The films so prepared were then subjected to electrical discharge treatment as shown in Table III. The generator frequency was 10 kilocycles, a single pass was used and the treating temperature was 100° C. As with Examples 1 to 26, laminates were produced using the nitrile rubber adhesive with Examples 27, 28, 30 and 32 and the acrylic-epoxy adhesive with Examples 29, 31

What is claimed is:
1. A process for modifying and improving the surface characteristics of continuous polymeric film comprising polyimide of an organic diamine and a tetracarboxylic acid dianhydride containing fluorocarbon polymer which comprises continuously passing a continuous polymeric film between parallel positive and negative electrodes spaced to provide a gap therebetween of from 0.015 to 0.1 of an inch, continuously applying to said positive electrode an alternating current of from 0.1 to 0.5 ampere at a voltage in excess of 3000 volts, and at a frequency in the range of 10,000 to 20,000 cycles per second effective to create an electrical discharge therebetween, and maintaining an atmosphere consisting essentially of air or its components between said electrodes at substantially atmospheric pressure and at a temperature of at least 70° C. whereby to expose a surface of said film to the action of said electrical discharge and said air atmosphere, said film being passed between said electrodes at a speed effective to expose a surface of said film to the action of said electrical discharge for a period related to said voltage and current to impart discharge of at least about 300 watt-minutes per square foot of polymeric film surface.

2. The process of claim 1 wherein the polyimide is the polyimide of 4,4′-diaminodiphenyl ether and pyromellitic dianhydride, and the fluorocarbon polymer is tetrafluoroethylene polymer.

3. The process of claim 2 wherein the polyimide also contains poly(m-phenylene isothalamide).

4. The process of claim 3 wherein the polyimide, fluorocarbon polymer and polyamide are present in said shaped structure in a weight ratio of 63:32:5.

5. The process of claim 2 wherein the polyimide and fluorocarbon polymer are present in said shaped structure in a weight ratio of 65:35.

References Cited

UNITED STATES PATENTS 3,274,089   9/1966   Wolinski _____ 204—165

ROBERT K. MIHALEK, Primary Examiner

U.S. Cl. X.R.

204—169